(12) United States Patent
Yoshida et al.

(10) Patent No.: US 12,409,818 B2
(45) Date of Patent: Sep. 9, 2025

(54) CONTROL DEVICE

(71) Applicant: ADVICS CO., LTD., Kariya (JP)

(72) Inventors: Kazuaki Yoshida, Kariya (JP); Miyu Tamura, Kariya (JP)

(73) Assignee: ADVICS CO., LTD., Kariya (JP)

( * ) Notice: Subject to any disclaimer, the term of this patent is extended or adjusted under 35 U.S.C. 154(b) by 80 days.

(21) Appl. No.: 18/570,357

(22) PCT Filed: Jun. 27, 2022

(86) PCT No.: PCT/JP2022/025592
§ 371 (c)(1),
(2) Date: Dec. 14, 2023

(87) PCT Pub. No.: WO2023/276962
PCT Pub. Date: Jan. 5, 2023

(65) Prior Publication Data
US 2024/0253607 A1 Aug. 1, 2024

(30) Foreign Application Priority Data
Jun. 29, 2021 (JP) .................................. 2021-107792

(51) Int. Cl.
*B60T 8/28* (2006.01)
*B60T 8/171* (2006.01)
*B60T 8/172* (2006.01)

(52) U.S. Cl.
CPC ............ *B60T 8/28* (2013.01); *B60T 8/171* (2013.01); *B60T 8/172* (2013.01); *B60T 2201/03* (2013.01); *B60T 2250/00* (2013.01)

(58) Field of Classification Search
CPC . B60T 8/28; B60T 8/171; B60T 8/172; B60T 2201/03; B60T 2250/00; B60T 8/1766; B60W 30/02
See application file for complete search history.

(56) References Cited

U.S. PATENT DOCUMENTS 6,122,585 A * 9/2000 Ono ...................... B60T 8/445
303/166

FOREIGN PATENT DOCUMENTS

JP 2007196705 A 8/2007

* cited by examiner

*Primary Examiner* — Lindsay M Low
*Assistant Examiner* — Charles J Brauch
(74) *Attorney, Agent, or Firm* — BUCHANAN INGERSOLL & ROONEY PC (57) ABSTRACT

In the case where drive power of a vehicle is increased, a control device starts micro-braking control for generating a braking force on at least one wheel of a front wheel and a rear wheel. During execution of the micro-braking control, the control device estimates an efficacy factor that is a factor indicating a relationship of a magnitude of the braking force to a magnitude of a pressing force generated by a friction braking system. The control device estimates the efficacy factor for the wheel, to which the braking force is applied by the micro-braking control, on the basis of a deviation between generated drive power, which is based on a required value for a power source, and actual drive power actually acting on the vehicle, and the pressing force corresponding to the wheel, to which the braking force is applied by the micro-braking control.

18 Claims, 5 Drawing Sheets

FIG. 1

FIG. 2A DRIVE POWER

FIG. 2B BRAKING HYDRAULIC PRESSURE P

CONTROL DEVICE

TECHNICAL FIELD

The present disclosure relates to a control device that is applied to a vehicle including a friction braking system.

BACKGROUND ART

PTL 1 discloses a braking control device that estimates, as a degree of braking effectiveness, a relationship indicating a magnitude of an actual braking force to a wheel cylinder pressure when a brake pedal is depressed. More specifically, it is configured to actuate a brake and estimate the degree of the braking effectiveness on the basis of a deviation between actual deceleration and estimated deceleration, the actual deceleration being calculated from front-rear acceleration that is based on a detection signal from a front-rear acceleration sensor, and the estimated deceleration being calculated from the wheel cylinder pressure.

CITATION LIST

Patent Literature

PTL 1: JP2007-196705A

SUMMARY

Technical Problem

In some cases, a relationship between a magnitude of a pressing force to press a friction member against a rotary body integrally rotating with a wheel and a magnitude of a braking force applied to the wheel differs between a front wheel and a rear wheel of vehicle wheels. The braking control device disclosed in PTL 1 uniformly estimates the degree of the braking effectiveness and does not take the difference between the front wheel and the rear wheel into consideration.

Solution to Problem

In the summary, a control device for solving the above problem is a control device that is applied to a vehicle having: a power source that generates drive power; and a friction braking system that applies a braking force to a wheel according to a pressing force to press a friction member against a rotary body integrally rotating with the wheel and can adjust the braking forces applied to a front wheel and a rear wheel of the wheels separately, and includes: a braking control unit that controls the friction braking system; and an estimation unit that estimates an efficacy factor as a factor indicating a relationship of a magnitude of the braking force to a magnitude of the pressing force. The braking control unit can start micro-braking control for generating the braking force on at least one wheel of the front wheel and the rear wheel in the case where the drive power is increased. During execution of the micro-braking control, the estimation unit estimates the efficacy factor for the wheel, to which the braking force is applied by the micro-braking control, on the basis of a deviation between generated drive power that is based on a required value for the power source and actual drive power that actually acts on the vehicle, and the pressing force that corresponds to the wheel, to which the braking force is applied by the micro-braking control.

In the above configuration, the micro-braking control is executed as control for applying the braking force in order to estimate the efficacy factor. In the micro-braking control, the braking force is generated on at least one wheel of the front wheel and the rear wheel. Then, the pressing force corresponding to the wheel, to which the braking force is applied, is used to estimate the efficacy factor. In this way, the efficacy factor for the front wheel and the efficacy factor for the rear wheel can be estimated distinctively.

Furthermore, the micro-braking control is started in the case where the drive power is increased. The micro-braking control is executed in the case where the drive power is increased. In this way, even when the braking force is generated on at least one wheel of the front wheel and the rear wheel, it is possible to alleviate an impact of generation of the braking force, such as an occupant of the vehicle having a sense of discomfort and pitching motion of the vehicle.

DESCRIPTION OF EMBODIMENTS

A description will hereinafter be made on an embodiment of a control device with reference to FIG. 1 to FIG. 8A.

Figure 1:
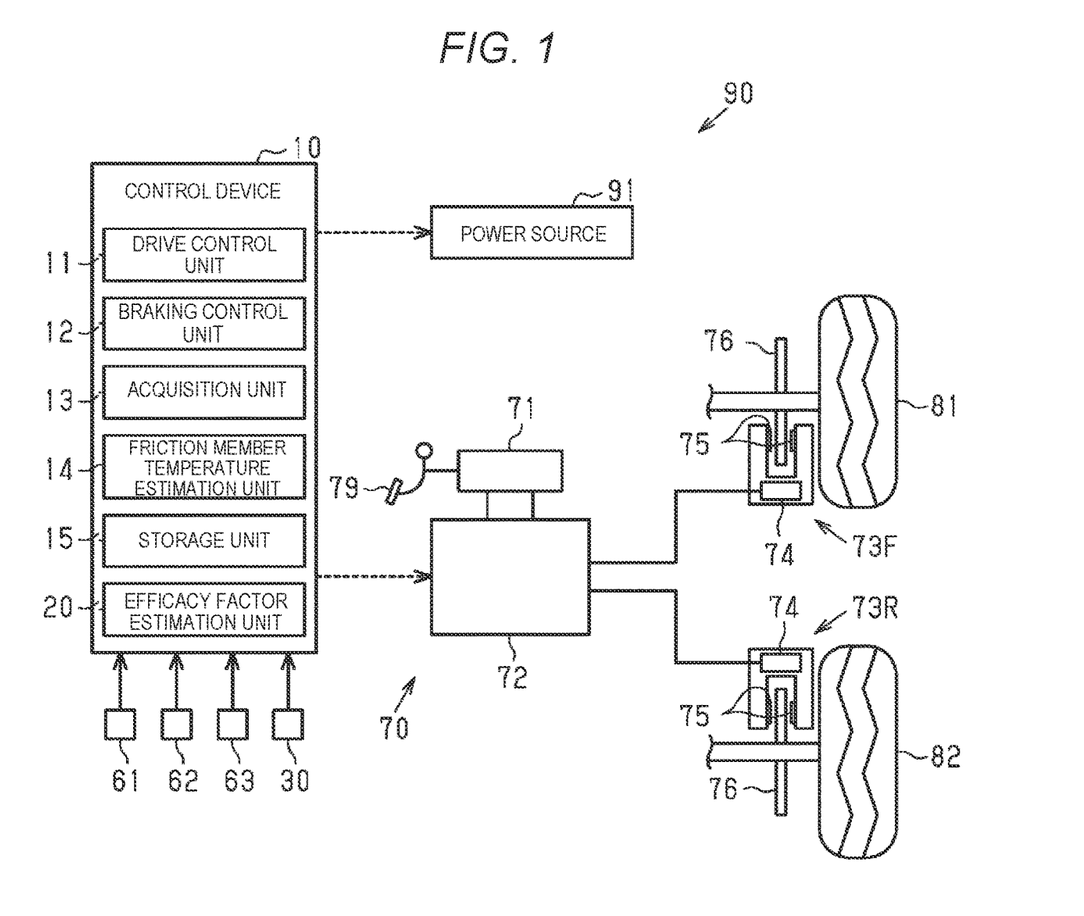
FIG. 1 is a schematic view illustrating an embodiment of a control device for a vehicle and a vehicle including the control device.

FIG. 1 illustrates a vehicle 90 that includes a power source 91, a friction braking system 70, and a control device 10. A control target of the control device 10 is the friction braking system 70. The friction braking system 70 can generate a frictional braking force to the vehicle 90.

FIG. 1 illustrates one of front wheels 81 of wheels provided to the vehicle 90 and one of rear wheels 82 of the wheels provided to the vehicle 90.

The vehicle 90 includes a braking operation member 79. The braking operation member 79 can be operated by a driver of the vehicle 90. An example of the braking operation member 79 is a brake pedal.

The vehicle 90 may include an autonomous driving control device 30 that calculates a command value for autonomous travel of the vehicle 90. The autonomous driving control device 30 can exchange information with the control device 10.

<Power Source>

An example of the power source 91 provided to the vehicle 90 is an electric motor. The power source 91 is not limited to the electric motor and may be an internal combustion engine. Alternatively, the electric motor and the internal combustion engine may each be adopted as the power source 91. Further alternatively, the power source 91 may be an in-wheel motor that is the electric motor attached to a wheel of each of the wheels of the vehicle 90.

<Friction Braking System>

A description will be made on the friction braking system 70. The friction braking system 70 includes braking mechanisms 73F, 73R, each of which corresponds to respective one of the wheels of the vehicle 90. FIG. 1 exemplifies the braking mechanism 73F corresponding to the front wheel 81 and the braking mechanism 73R corresponding to the rear wheel 82.

An example of the friction braking system 70 is a hydraulic braking system. The friction braking system 70 as the hydraulic braking system includes: a hydraulic pressure generator 71; and a braking actuator 72 to which a brake fluid is supplied from the hydraulic pressure generator 71. The braking operation member 79 is coupled to the hydraulic pressure generator 71. The hydraulic pressure generator 71 can generate a hydraulic pressure that corresponds to a braking operation amount as an operation amount of the braking operation member 79 by the driver of the vehicle 90. The hydraulic pressure generator 71 can also generate the hydraulic pressure on the basis of the command value that is calculated by the autonomous driving control device 30.

Since components are common between the braking mechanisms 73F, 73R, the components are denoted by common reference signs for description. The braking mechanisms 73F, 73R are each configured to include: a wheel cylinder 74; a rotary body 76 that rotates integrally with the wheel; and a friction member 75 that can be pressed against the rotary body 76. An example of each of the braking mechanisms 73F, 73R is a disc brake. Each of the braking mechanisms 73F, 73R may be a drum brake.

The braking actuator 72 is connected to each of the wheel cylinders 74. For example, when the braking operation member 79 is operated, the brake fluid in an amount corresponding to the operation amount thereof is supplied to each of the wheel cylinders 74. The hydraulic braking system can generate the frictional braking force according to a WC pressure that is the hydraulic pressure in each of the wheel cylinders 74 provided to the braking mechanisms 73F, 73R. The braking mechanisms 73F, 73R are each configured that, as the WC pressure is increased, a force of pressing the friction member 75 against the rotary body 76 integrally rotating with the wheel is increased. Each of the braking mechanisms 73F, 73R can apply the larger braking force to the wheel as the WC pressure is increased. The WC pressure is an example of a value that indicates a pressing force to press the friction member 75 against the rotary body 76.

The braking actuator 72 can change the hydraulic pressure in each of the wheel cylinders 74 separately such that a magnitude of the braking force applied to each of the wheels differs. A sum of the braking forces that are applied to the front wheels 81 by the braking mechanisms 73F provided in a manner to correspond to the front wheels 81 will be referred to as a front-wheel braking force. A sum of the braking forces that are applied to the rear wheels 82 by the braking mechanisms 73R provided in a manner to correspond to the rear wheels 82 will be referred to as a rear-wheel braking force.

<Sensor>

The vehicle 90 includes various sensors. FIG. 1 illustrates, as an example of the various sensors, a hydraulic pressure sensor 61, a front-rear acceleration sensor 62, and a wheel speed sensor 63. Detection signals from the various sensors are input to the control device 10.

The hydraulic pressure sensor 61 is a sensor that detects the pressing force for pressing the friction member 75 against the rotary body 76 in the friction braking system 70. As an example, the hydraulic pressure sensor 61 can detect the WC pressure in each of the wheel cylinders 74 as a braking hydraulic pressure P. In this case, the hydraulic pressure sensor 61 is attached in a manner to correspond to each of the wheel cylinders 74. A value that is detected as the braking hydraulic pressure P is not limited to the WC pressure as long as such a value is a pressure corresponding to the pressing force.

The front-rear acceleration sensor 62 is a sensor that detects acceleration in a front-rear direction of the vehicle 90.

The wheel speed sensor 63 is a sensor that detects a wheel speed. The wheel speed sensor 63 is provided to each of the wheels. A vehicle speed can be calculated on the basis of the wheel speed.

<Control Device>

A description will be made on the control device 10. The control device 10 is configured to include plural functional units that execute various types of control. FIG. 1 illustrates, as an example of the functional units, a drive control unit 11, a braking control unit 12, an acquisition unit 13, a friction member temperature estimation unit 14, a storage unit 15, and an efficacy factor estimation unit 20. The efficacy factor estimation unit 20 corresponds to an estimation unit that estimates an efficacy factor K. The functional units that are provided to the control device 10 can exchange information with each other.

The vehicle 90 may include another control device instead of the control device 10. In addition, some of the functional units provided to the control device 10 may be provided to the other control device.

Here, the control device 10, the autonomous driving control device 30, and the other control device may each have any of the following configurations [a] to [c]. [a] One or more processors that execute various types of processing according to a computer program are provided. The processor includes a processing unit. Examples of the processing unit are a CPU, a DSP, and a GPU. The processor includes memory. Examples of the memory include RAM, ROM, and flash memory. The memory stores a program code or a command configured to cause the processing unit to execute the processing. The memory, that is, a computer-readable medium includes any available medium that can be accessed by a general-purpose or dedicated computer. [b] One or more hardware circuits that execute the various types of the processing are provided. Examples of the hardware circuit are an Application Specific Integrated Circuit (ASIC), a Complex Programmable Logic Device (CPLD) and a Field Programmable Gate Array (FPGA). [c] A circuit including: the processor that partially executes the various types of the processing according to the computer program; and the hardware circuit that executes rest of the various types of the processing are provided.

A description will be made on the drive control unit 11. The drive control unit 11 can control the power source 91.

The drive control unit 11 can actuate the power source 91 and transmit drive power to a drive wheel. For example, the drive control unit 11 calculates a required value for the power source 91 that corresponds to an operation of an accelerator operation member by the driver of the vehicle 90, and thus can transmit the drive power from the power source 91 on the basis of the required value. Alternatively, for example, the drive control unit 11 can transmit the drive power from the power source 91 on the basis of the command value that is calculated by the autonomous driving control device 30. The drive control unit 11 can calculate generated drive power Fp as the drive power, which is output by the power source 91, on the basis of the required value for the power source 91. For example, the generated drive power Fp can be calculated on the basis of a workload of the electric motor that is mounted as the power source 91.

A description will be made on the braking control unit 12. The braking control unit 12 can control the friction braking system 70. The braking control unit 12 can actuate and cause the friction braking system 70 to generate the braking force.

A description will be made on exemplary functions of the braking control unit 12.

The braking control unit 12 can calculate a required braking force BP as a required value of the braking force to be applied to the vehicle 90. For example, the required braking force BP can be calculated on the basis of the operation amount of the braking operation member 79. In addition, for example, the required braking force BP can be acquired on the basis of the command value that is calculated by the autonomous driving control device 30.

The braking control unit 12 can calculate a front-rear distribution ratio a as a value that indicates a ratio of the braking force applied to the front wheel 81 to the required braking force BP. The front-rear distribution ratio a indicates a ratio of the braking force applied to the front wheel 81 to a total braking force that is a sum of the braking force applied to the front wheel 81 and the braking force applied to the rear wheel 82. The braking control unit 12 can calculate a required value of the front-wheel braking force and a required value of the rear-wheel braking force on the basis of the required braking force BP and the front-rear distribution ratio a. Hereinafter, the required value of the front-wheel braking force will be referred to as a required front-wheel braking force BPf. In addition, the required value of the rear-wheel braking force will be referred to as a required rear-wheel braking force BPr. For example, when the front-rear distribution ratio a is "1", the required front-wheel braking force BPf is equal to the required braking force BP. In addition, for example, when the front-rear distribution ratio a is "0", the required rear-wheel braking force BPr is equal to the required braking force BP.

The braking control unit 12 can convert between the required value of the braking force and a target value of the pressing force by using a conversion factor Kb. The conversion factor Kb is a factor that indicates a relationship of the magnitude of the braking force to a magnitude of the pressing force. For example, the required front-wheel braking force BPf can be converted to a target value of the WC pressure for the front wheel 81. Similarly, the required rear-wheel braking force BPr can be converted to a target value of the WC pressure for the rear wheel 82. The braking control unit 12 actuates the friction braking system 70 such that the generated pressing force follows the target value. The braking control unit 12 stores, as an initial value of the conversion factor Kb, a value that is calculated in advance on the basis of specifications of the vehicle 90, experimental data, and the like.

The braking control unit 12 can execute micro-braking control. As will be described in detail below, the micro-braking control is control for generating the braking force on at least one wheel of the front wheel 81 and the rear wheel 82 in order to execute factor estimation processing by the efficacy factor estimation unit 20.

A description will be made on the acquisition unit 13. The acquisition unit 13 can calculate a state amount of the vehicle 90 on the basis of the detection signals from the various sensors. For example, the acquisition unit 13 can calculate the braking hydraulic pressure P on the basis of the detection signal from the hydraulic pressure sensor 61. The acquisition unit 13 can calculate front-rear acceleration Gx on the basis of the detection signal from the front-rear acceleration sensor 62. The acquisition unit 13 can calculate the wheel speed on the basis of the detection signal from the wheel speed sensor 63.

The acquisition unit 13 can calculate vehicle weight M as weight of the vehicle 90. In addition to the weight of the vehicle 90 itself, weight of an occupant and a load is considered for the vehicle weight M. The vehicle weight M can be calculated by using the generated drive power Fp and the front-rear acceleration Gx at the time when the generated drive power Fp acts on the vehicle 90, for example. A method for calculating the vehicle weight M is not particularly limited and may be calculated by a least-squares method, or an arithmetic mean of values calculated multiple times may be used as the vehicle weight M.

The friction member temperature estimation unit 14 can estimate a temperature of the friction member 75. The temperature of the friction member 75 can be estimated by cumulating a temperature increase amount and a temperature reduction amount, for example. The temperature increase amount can be calculated from a reduction rate of the wheel speed during braking of the vehicle 90 and the WC pressure, for example. The temperature reduction amount can be calculated on the basis of a time when the friction member 75 is not in contact with the rotary body 76, for example.

A description will be made on the storage unit 15. The storage unit 15 can store detection values acquired from the various sensors. The storage unit 15 can also store a calculated value that is calculated by each of the functional units.

Figure 7:
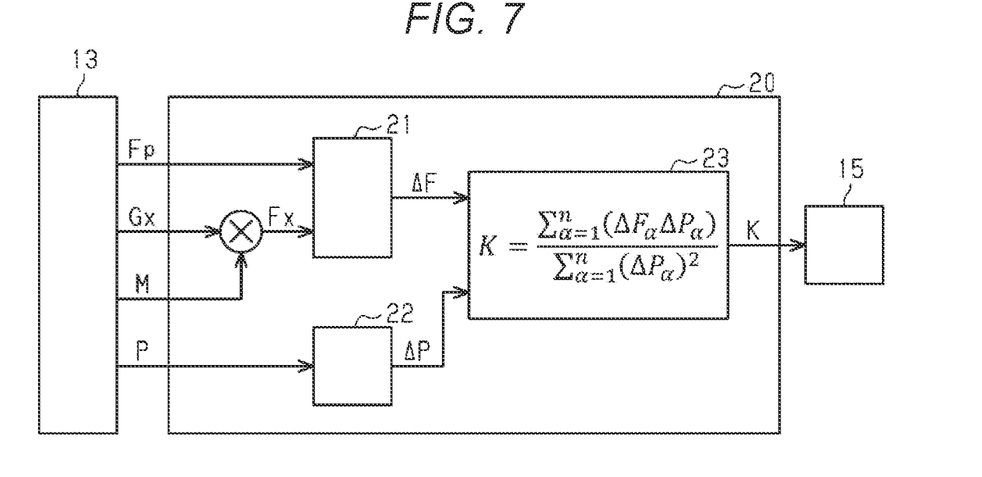
FIG. 7 is a block diagram illustrating an efficacy factor estimation unit.

A description will be made on the efficacy factor estimation unit 20. The efficacy factor estimation unit 20 can execute the factor estimation processing to estimate the efficacy factor K. The efficacy factor K is the factor that indicates the relationship of the magnitude of the braking force to the magnitude of the pressing force. The efficacy factor estimation unit 20 executes the factor estimation processing during execution of the micro-braking control. In the factor estimation processing, the efficacy factor K is estimated for the wheel, to which the braking force is applied by the micro-braking control, on the basis of a deviation between the generated drive power Fp and actual drive power Fx that actually acts on the vehicle 90, and the pressing force that corresponds to the wheel, to which the braking force is applied by the micro-braking control. The efficacy factor estimation unit 20 can estimate each of the efficacy factor K for the front wheel 81 and the efficacy factor K for the rear wheel 82. As illustrated in FIG. 7, the efficacy factor estimation unit 20 includes a deviation calculation section 21, a fluctuation pressure calculation section 22, and an output section 23.

<Use of Efficacy Factor>

The efficacy factor K that is estimated by the efficacy factor estimation unit 20 can be used as follows. For example, the efficacy factor K can be used to correct the conversion factor Kb that is stored in the braking control unit 12. For example, the braking control unit 12 can replace the efficacy factor K as the new conversion factor Kb. For example, the braking control unit 12 can adjust the front-wheel braking force and the rear-wheel braking force by adjusting the front-rear distribution ratio a on the basis of a difference between the efficacy factor K for the front wheel 81 and the efficacy factor K for the rear wheel 82.

<Estimation Principle of Efficacy Factor>

A description will be made on a principle to estimate the efficacy factor K by the factor estimation processing with reference to FIGS. 2A and 2B and FIG. 3.

Figure 2A:
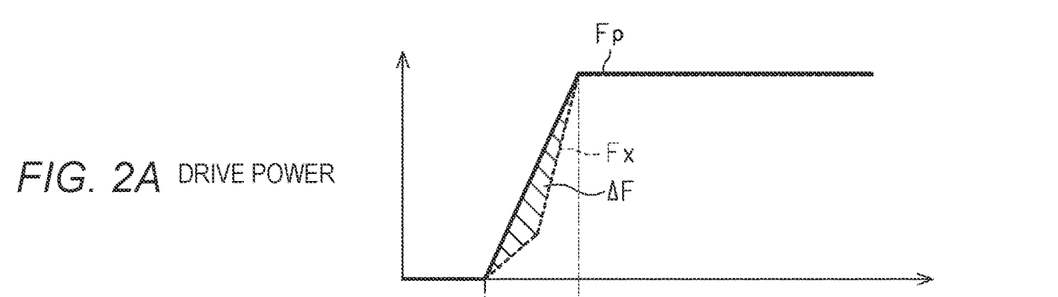
FIGS. 2A and 2B are timing charts exemplifying a relationship between transitions of a braking hydraulic pressure and drive power in the case where a braking force is applied during an increase in the drive power.
Figure 2B:
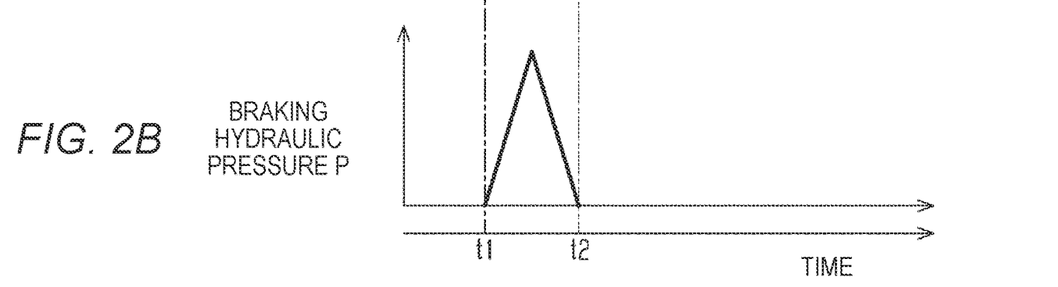

In an example illustrated in FIG. 2A, the drive power is increased in a period from timing t1 to timing t2. In FIG. 2A, the generated drive power Fp is indicated by a solid line. In addition, the actual drive power Fx is indicated by a broken line. In the period from the timing t1 to the timing t2 in which the generated drive power Fp is increased, the braking force is generated. For this reason, as illustrated in FIG. 2B, the braking hydraulic pressure P is generated in the period from the timing t1 to the timing t2. A specific example of the generated drive power Fp is a sum of the drive power for all the wheels transmitted from the power source 91 to wheel ground surfaces, for example. A specific example of the actual drive power Fx is a sum of the drive power for all the wheels actually generated on the wheel ground surfaces, for example.

Since the braking force is applied to the vehicle 90 in the period from the timing t1 to the timing t2, as indicated by the broken line in FIG. 2A, the actual drive power Fx that actually acts on the vehicle 90 is lower than the generated drive power Fp. At this time, the actual drive power Fx becomes lower than the generated drive power Fp as the braking force is increased. In other words, as the braking force is increased, a drive power deviation ΔF, which is a deviation between the generated drive power Fp and the actual drive power Fx, is increased.

That is, by using the drive power deviation ΔF, which is the deviation between the generated drive power Fp and the actual drive power Fx, and a fluctuation amount of the braking hydraulic pressure P, it is possible to estimate the braking force, which actually acts on the vehicle 90, on the basis of the drive power deviation ΔF that corresponds to the fluctuation amount of the braking hydraulic pressure P. In this way, it is possible to calculate the braking hydraulic pressure P, that is, a relationship between the pressing force and the actual braking force.

Figure 3:
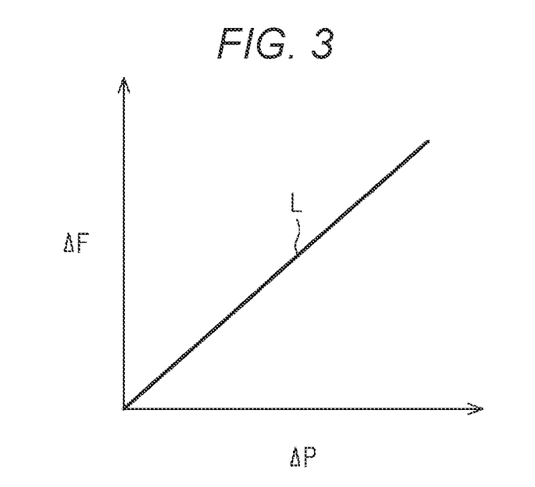
FIG. 3 is a graph illustrating a relationship among the braking hydraulic pressure, an efficacy factor, and a reduced amount of the drive power.

FIG. 3 illustrates a relationship between a hydraulic pressure fluctuation amount ΔP, which is the fluctuation amount of the braking hydraulic pressure P, and the drive power deviation ΔF. The relationship is one in which the drive power deviation ΔF is increased as the hydraulic pressure fluctuation amount ΔP is increased, and can be expressed as an approximate linear line L as illustrated in FIG. 3. A gradient of the approximate linear line L corresponds to the efficacy factor K.

For example, the efficacy factor K can be calculated by the least-squares method. A description will be made on a calculation method by the least-squares method by using a relational equation (equation 1) to a relational equation (equation 3). The least-squares method calculates the efficacy factor K with which a sum-of-squares error J in the relational equation (equation 1) is minimized.

[Equation 1]

$$J = \sum_{\alpha=1}^{n}(\Delta F_\alpha - (K\Delta P_\alpha + \varepsilon))^2 \quad \text{(equation 1)}$$

The relational equation (equation 3) is obtained when the relational equation (equation 1) is solved in a manner to satisfy the relational equation (equation 2).

[Equation 2]

$$\frac{\partial J}{\partial K} = 0 \quad \text{(equation 2)}$$

[Equation 3]

$$K = \frac{\sum_{\alpha=1}^{n}(\Delta F_\alpha \Delta P_\alpha)}{\sum_{\alpha=1}^{n}(\Delta P_\alpha)^2} \quad \text{(equation 3)}$$

The efficacy factor K can be calculated by the obtained relational equation (equation 3).

The method for calculating the efficacy factor K is not limited to the calculation method by the least-squares method. For example, the efficacy factor K may be a value that is calculated as an arithmetic mean.

<Micro-Braking Control>

A description will be made on details of the micro-braking control that is executed by the braking control unit 12. The micro-braking control refers to a series of control for actuating the friction braking system 70 by executing application processing and cancellation processing, which will be described below.

Figure 4:
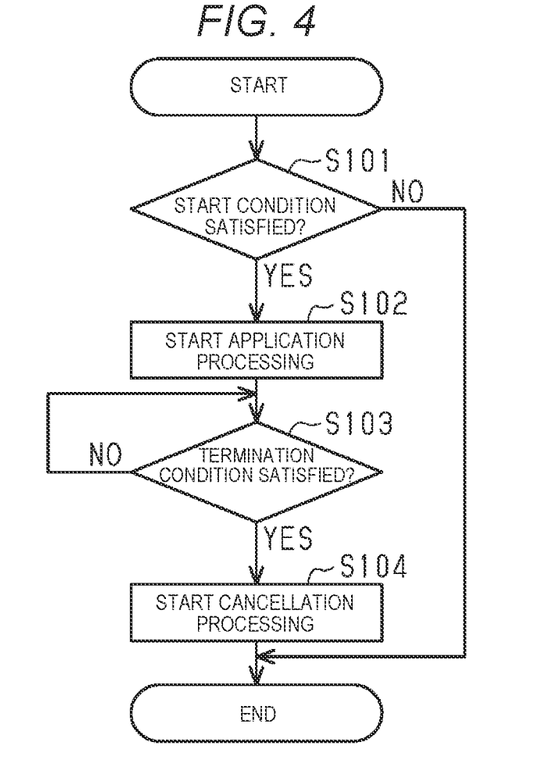
FIG. 4 is a flowchart illustrating a processing flow at the time when the control device executes micro-braking control.

FIG. 4 illustrates a processing flow that is executed by the braking control unit 12. This processing routine is repeatedly executed at predetermined intervals.

When this processing routine is started, first, in step S101, the braking control unit 12 determines whether a start condition is satisfied. For example, the braking control unit 12 can determine that the start condition is satisfied in the case where both of the following condition A and the following condition B are satisfied. (Condition A) The calculation of vehicle weight M is completed. (Condition B) The drive power is being increased.

If the start condition is not satisfied (S101: NO), the braking control unit 12 terminates this processing routine once.

On the other hand, if the start condition is satisfied (S101: YES), the braking control unit 12 proceeds the processing to step S102.

In step S102, the braking control unit 12 starts the application processing. In the application processing, the braking control unit 12 calculates the required braking force BP that corresponds to the generated drive power Fp. A description will be made on a relationship between the generated drive power Fp and the required braking force BP with reference to FIG. 5.

Figure 5:
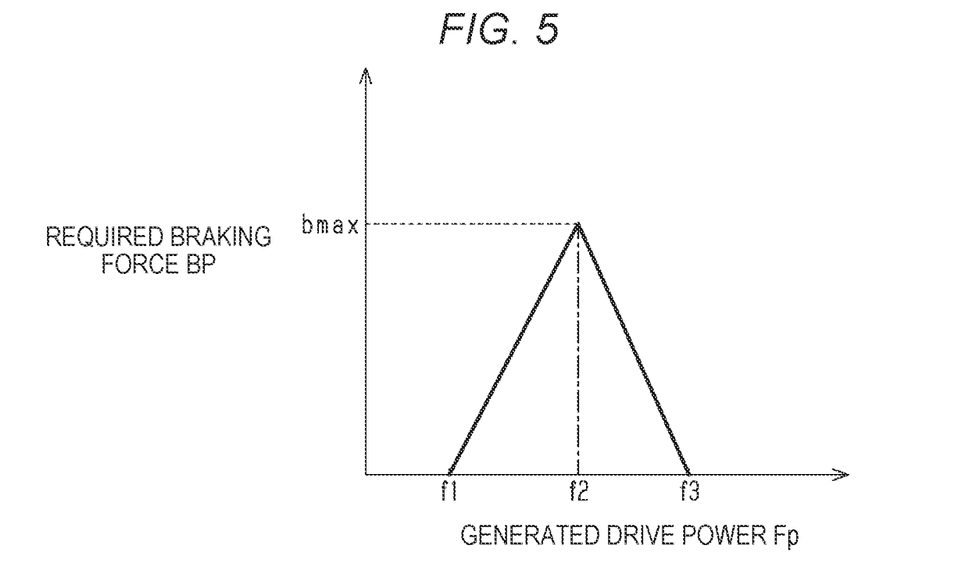
FIG. 5 is a graph illustrating a map for calculating a required braking force during execution of the micro-braking control.

FIG. 5 is an example of a map illustrating the relationship between the generated drive power Fp and the required braking force BP. The map illustrating such a relationship is stored in the braking control unit 12.

According to the relationship illustrating in FIG. 5, the required braking force BP is calculated within a range where the generated drive power Fp is equal to or higher than first drive power f1 and is equal to or lower than third drive power f3. In a range where the generated drive power Fp is equal to or higher than the first drive power f1 and is equal to or lower than second drive power f2, the larger required braking force BP is calculated as the generated drive power Fp is increased. The second drive power f2 corresponds to a specified threshold value of the generated drive power Fp. In a range where the generated drive power Fp is higher than the second drive power f2 and is equal to or lower than the third drive power f3, the smaller required braking force BP is calculated as the generated drive power Fp is increased. That is, the calculated required braking force BP becomes maximum when the generated drive power Fp is the second drive power f2. A maximum braking force bmax at the time when the generated drive power Fp is the second drive power f2 is set to a smaller value than the braking force that matches the second drive power f2. Here, matching means a state where the braking force cancels out the drive power and a movement amount of the vehicle 90 becomes "0" when it is assumed that the road surface is level. An example of the maximum braking force bmax is a magnitude that corresponds to 10% of the braking force matching the second drive power f2.

In addition, the braking control unit 12 can set the front-rear distribution ratio a appropriately in the micro-braking control. In the case where the front-rear distribution ratio a is fixed to "0" or "1" during the execution of the micro-braking control, it is possible to select whether the braking force that is based on the calculated required braking force BP is applied to the front wheel 81 or the rear wheel 82. As an example, the braking control unit 12 can alternately execute the micro-braking control for applying the braking force only to the front wheel 81 and the micro-braking control for applying the braking force only to the rear wheel 82. Furthermore, the braking control unit 12 can also make the front-rear distribution ratio a fluctuate during the execution of the micro-braking control. The braking force can also be applied to the front wheel 81 and the rear wheel 82 by setting the front-rear distribution ratio a to a value that is larger than "0" and smaller than "1".

Referring back to FIG. 4, after starting the application processing and calculating the required braking force BP in step S102, the braking control unit 12 calculates the target value of the WC pressure on the basis of the required braking force BP and the conversion factor Kb. Next, the braking control unit 12 actuates the friction braking system 70 on the basis of the target value of the WC pressure. As a result, application of the braking force is started.

Once the braking control unit 12 starts the application processing in step S102, the processing proceeds to step S103.

In step S103, the braking control unit 12 determines whether a termination condition is satisfied. For example, in the case where a specified time has elapsed since the start of the application processing, the braking control unit 12 determines that the termination condition is satisfied.

In regard to the processing in step S103, the determination can be made as follows. Even in the case where the specified time has not elapsed since the start of the application processing, the braking control unit 12 can determine that the termination condition is satisfied. For example, in the case where the drive power starts reduced, the braking control unit 12 may determine that the termination condition is satisfied. Alternatively, for example, in the case where the operation of the braking operation member 79 by the driver intervenes, the braking control unit 12 can determine that the termination condition is satisfied. Furthermore, in the case where an operation speed of the braking operation member 79 is higher than a specified reduction operation determination value, the braking control unit 12 can determine that the termination condition is satisfied. The reduction operation determination value can be set as a value with which it is possible to determine that the driver requests rapid braking in the case where the operation speed is higher than the reduction operation determination value. Moreover, for example, in the case where an operation speed of the accelerator operation member by the driver is higher than a specified acceleration operation determination value, the braking control unit 12 can determine that the termination condition is satisfied. The acceleration operation determination value can be set as a value with which it is possible to determine that the driver requests rapid acceleration in the case where the operation speed is higher than the acceleration operation determination value. In the case where the rapid braking or the rapid acceleration is requested by the autonomous driving control device 30, the braking control unit 12 may also determine that the termination condition is satisfied.

If the termination condition is satisfied (S103: YES), the braking control unit 12 proceeds the processing to step S104. On the other hand, if the termination condition is not satisfied (S103: NO), the braking control unit 12 repeatedly executes the processing in step S103. The friction braking system 70 is actuated according to the application processing until the termination condition is satisfied.

In step S104, the braking control unit 12 starts the cancellation processing. More specifically, the braking control unit 12 terminates the application processing and starts the cancellation processing. In the cancellation processing, the friction braking system 70 is actuated such that the braking force applied by the application processing is reduced to "0". For example, the braking control unit 12 reduces the braking force at a predetermined reduction rate. The braking control unit 12 may bring the braking force into "0" within a predetermined time after the start of the cancellation processing. Once starting the cancellation processing, the braking control unit 12 terminates this processing routine.

<Factor Estimation Processing>

A description will be made on the factor estimation processing executed by the efficacy factor estimation unit 20.

Figure 6:
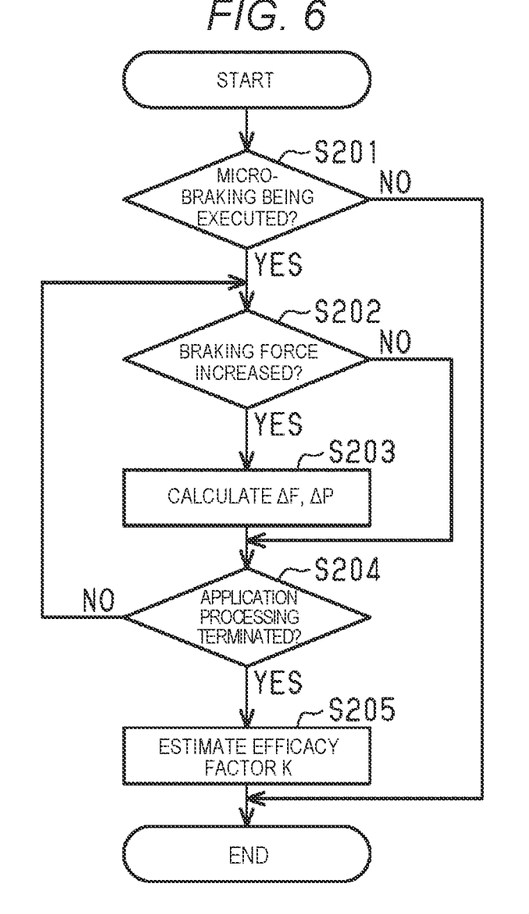
FIG. 6 is a flowchart illustrating a processing flow at the time when the control device estimates the efficacy factor.

FIG. 6 illustrates a processing flow that is executed by the efficacy factor estimation unit 20. This processing routine is repeatedly executed at predetermined intervals.

When this processing routine is started, first, in step S201, the efficacy factor estimation unit 20 determines whether the micro-braking control is being executed. If the micro-braking control is not being executed (S201: NO), the efficacy factor estimation unit 20 terminates this processing routine. On the other hand, if the micro-braking control is being executed (S201: YES), the efficacy factor estimation unit 20 proceeds the processing to step S202.

In step S202, the efficacy factor estimation unit 20 determines whether the braking force is being increased. If the braking force that is applied to the wheel by the micro-braking control is being increased (S202: YES), the efficacy factor estimation unit 20 proceeds the processing to step S203.

In step S203, the efficacy factor estimation unit 20 calculates the drive power deviation $\Delta F$ and the hydraulic pressure fluctuation amount $\Delta P$. The efficacy factor estimation unit 20 temporarily stores the calculated values for use in the calculation of the efficacy factor K. A description will be made on the calculations of the drive power deviation $\Delta F$ and the hydraulic pressure fluctuation amount $\Delta P$ with reference to FIG. 7.

As illustrated in FIG. 7, the efficacy factor estimation unit 20 acquires the generated drive power Fp via the acquisition unit 13. Furthermore, the efficacy factor estimation unit 20 acquires the vehicle weight M and the front-rear acceleration Gx via the acquisition unit 13. The efficacy factor estimation unit 20 calculates the actual drive power Fx by multiplying the vehicle weight M by the front-rear acceleration Gx. The generated drive power Fp and the actual drive power Fx are input to the deviation calculation section 21 of the efficacy factor estimation unit 20. The deviation calculation section 21 calculates the drive power deviation ΔF on the basis of the generated drive power Fp and the actual drive power Fx. At this time, the deviation calculation section 21 may calculate the drive power deviation ΔF by using a correction value calculated such that the drive power deviation ΔF at a time point when the micro-braking control is started becomes "0".

In addition, the efficacy factor estimation unit 20 acquires the braking hydraulic pressure P via the acquisition unit 13. The braking hydraulic pressure P is input to the fluctuation pressure calculation section 22 of the efficacy factor estimation unit 20. This braking hydraulic pressure P is the braking hydraulic pressure P corresponding to the wheel, to which the braking force is applied by the currently executed micro-braking control. The fluctuation pressure calculation section 22 compares the input braking hydraulic pressure P with the last braking hydraulic pressure P and calculates the hydraulic pressure fluctuation amount ΔP as the fluctuation amount of the braking hydraulic pressure P.

Referring back to FIG. 6, after the efficacy factor estimation unit 20 calculates the drive power deviation ΔF and the hydraulic pressure fluctuation amount ΔP in step S203, the efficacy factor estimation unit 20 proceeds the processing to step S204.

On the other hand, if the braking force for the wheel that is subject to the micro-braking control is not being increased in the processing in step S202 (S202: NO), the efficacy factor estimation unit 20 proceeds the processing to step S204. That is, in the case where the braking force for the wheel that is subject to the micro-braking control remains constant, or in the case where the braking force is reduced, the efficacy factor estimation unit 20 does not execute the processing in step S203, and the processing proceeds to step S204.

In step S204, the efficacy factor estimation unit 20 determines whether the application processing in the micro-braking control is terminated. If the application processing is terminated (S204: YES), the efficacy factor estimation unit 20 proceeds the processing to step S205.

On the other hand, if the application processing is not terminated (S204: NO), the efficacy factor estimation unit 20 proceeds the processing to step S202. Accordingly, the processing from step S202 to step S204 is repeatedly executed until the application processing is terminated. At this time, when the drive power deviation ΔF and the hydraulic pressure fluctuation amount ΔP are calculated by the processing in step S203, the efficacy factor estimation unit 20 maintains the values of the drive power deviation ΔF and the hydraulic pressure fluctuation amount ΔP that are calculated in the last time, and stores the drive power deviation ΔF and the hydraulic pressure fluctuation amount ΔP that are newly calculated. In this way, the calculated values of the drive power deviation ΔF and the hydraulic pressure fluctuation amount ΔP are accumulated.

In step S205, the efficacy factor estimation unit 20 estimates the efficacy factor K. The efficacy factor estimation unit 20 calculates the efficacy factor K on the basis of the drive power deviations ΔF and the hydraulic pressure fluctuation amounts ΔP, which are accumulated due to repeated execution of the processing in step S203.

As illustrated in FIG. 7, the drive power deviation ΔF and the hydraulic pressure fluctuation amount ΔP are input to the output section 23 of the efficacy factor estimation unit 20. The output section 23 uses the drive power deviation ΔF and the hydraulic pressure fluctuation amount ΔP to calculate the efficacy factor K on the basis of the relational equation (equation 3). Referring back to FIG. 6, after estimating the efficacy factor K in step S205, the efficacy factor estimation unit 20 terminates this processing routine.

As illustrated in FIG. 7, the efficacy factor estimation unit 20 can store the calculated efficacy factor K in the storage unit 15. At this time, the storage unit 15 may store, in association with the efficacy factor K, the state amount of the vehicle 90 at the time when the efficacy factor K is calculated. For example, the storage unit 15 may store the temperature of the friction member 75 and the efficacy factor K in association with each other. The storage unit 15 may store the temperature of the friction member 75, the efficacy factor K, and the vehicle speed in association with each other.

<Operation and Effects>

A description will be made on operation and effects of this embodiment.

Figure 8A:
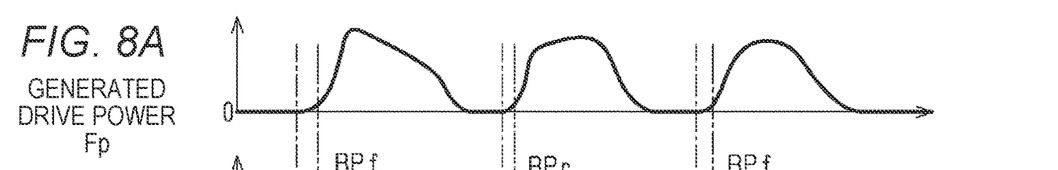
FIGS. 8A and 8B are timing charts illustrating a transition of the braking force by the micro-braking control that is executed by the control device.

In FIG. 8A, an example is illustrated in which the increased generated drive power Fp is reduced to "0" three times.

Figure 8B:
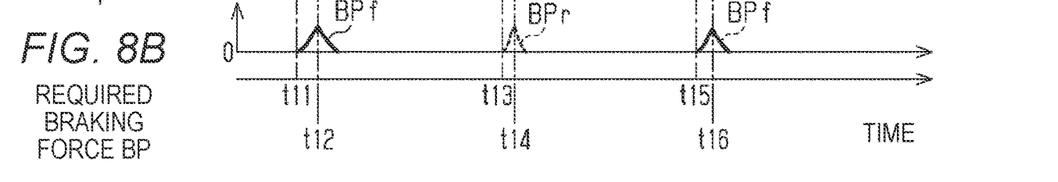

In the example illustrated in FIGS. 8A and 8B, at timing t11, it is determined that the start condition is satisfied, and the application processing in the micro-braking control is started (S102). Here, the braking force is applied only to the front wheel 81. Thus, as indicated by a solid line in FIG. 8B, the required front-wheel braking force BPf starts increased at the timing t11. At timing t12, it is determined that the termination condition is satisfied, the application processing is terminated, and the cancellation processing is started (S104). Thus, at the timing t12 onward, the required front-wheel braking force BPf is reduced.

Here, for example, in some cases, the front-rear distribution ratio a is set in a manner to suppress pitching motion of the vehicle 90 when the vehicle 90 is decelerated due to braking. For this reason, in some cases, when it is attempted to apply the braking force for the estimation of the efficacy factor K during the deceleration, it is difficult to make adjustments such as applying the braking force only to either one of the front wheel 81 and the rear wheel 82 and changing the front-rear distribution ratio a. In the case where the front-rear distribution ratio a is changed during the deceleration in order to estimate the efficacy factor K, the pitching motion is possibly increased, and the occupant of the vehicle 90 possibly have a sense of discomfort.

In order to handle this, the control device 10 starts the micro-braking control for executing the factor estimation processing when the drive power is increased. In this way, even when the braking force is generated on at least one wheel of the front wheel 81 and the rear wheel 82, it is possible to alleviate an impact of the generation of the braking force, such as the pitching motion of the vehicle 90 and the occupant of the vehicle 90 having the sense of discomfort.

In addition, in the micro-braking control executed by the control device 10, it is ensured that the required braking force BP does not exceed the drive power. Thus, even when the micro-braking control is executed, the acceleration of the vehicle 90 is less likely to be suppressed.

At timing t13 in FIGS. 8A and 8B, the generated drive power Fp is increased again, and the application processing is started. Here, the braking force is applied only to the rear wheel 82. Thus, as indicated by a broken line in FIG. 8B, the required rear-wheel braking force BPr starts increased at the timing t13. At timing t14, it is determined that the termination condition is satisfied. Thus, at the timing t14 onward, the required rear-wheel braking force BPr is reduced.

At timing t15 onward, the application processing is started only for the front wheel 81, and the required front-wheel braking force BPf is increased. At timing t16 onward, the required front-wheel braking force BPf is reduced by the cancellation processing.

In the example illustrated in FIGS. 8A and 8B, the required front-wheel braking force BPf is increased in a period from the timing t11 to the timing t12. Thus, the drive power deviation $\Delta F$ and the hydraulic pressure fluctuation amount $\Delta P$ are repeatedly calculated in such a period (S203). The hydraulic pressure fluctuation amount $\Delta P$ is calculated by using the braking hydraulic pressure P that corresponds to the pressing force for the front wheel 81. Then, when the application processing is terminated at the timing t12, the efficacy factor K is estimated for the front wheel 81 (S205).

Next, in a period from the timing t13 to the timing t14, the required rear-wheel braking force BPr is increased. Thus, in such a period, the hydraulic pressure fluctuation amount $\Delta P$ is calculated by using the braking hydraulic pressure P that corresponds to the pressing force for the rear wheel 82. When the drive power deviation $\Delta F$ and the hydraulic pressure fluctuation amount $\Delta P$ are repeatedly calculated, and the application processing is terminated at the timing t14, the efficacy factor K is estimated for the rear wheel 82.

In a period from the timing t15 to the timing t16, similar to the period from the timing t11 to the timing t12, the hydraulic pressure fluctuation amount $\Delta P$ is calculated by using the braking hydraulic pressure P that corresponds to the pressing force for the front wheel 81. Then, the efficacy factor K is estimated for the front wheel 81.

In the micro-braking control executed by the control device 10, the braking force is generated on at least one wheel of the front wheel 81 and the rear wheel 82. Then, in the factor estimation processing, the pressing force corresponding to the wheel, to which the braking force is applied, is used to estimate the efficacy factor K. In this way, the efficacy factor K for the front wheel 81 and the efficacy factor K for the rear wheel 82 can be estimated distinctively.

In the control device 10, the drive power deviation $\Delta F$, which is the deviation between the generated drive power Fp and the actual drive power Fx, is used to estimate the efficacy factor K. In regard to the vehicle 90 for which the electric motor is adopted as the power source 91, calculation accuracy of the generated drive power Fp is likely to be higher than that in a case where the power source 91 is the internal combustion engine. For this reason, it is possible to accurately estimate the efficacy factor K for the vehicle 90 for which the electric motor is adopted as the power source 91.

In the control device 10, the drive power deviation $\Delta F$ and the hydraulic pressure fluctuation amount $\Delta P$ are calculated only when the braking force is being increased. That is, only the drive power deviation $\Delta F$ and the hydraulic pressure fluctuation amount $\Delta P$ at the time when the braking force is being increased are used to estimate the efficacy factor K. For this reason, a difference between the case where the braking force is being increased and the case where the braking force is being reduced does not affect the estimation of the efficacy factor K. Thus, a hysteresis characteristic of the friction braking system 70 can be ignored in the estimation of the efficacy factor K. According to the control device 10, the efficacy factor K can be estimated accurately.

According to the control device 10, the conversion factor Kb can be corrected by using the efficacy factor K. In this way, the relationship between the pressing force and the braking force is made accurate, and it is thus possible to suppress deviation between the required braking force BP and the braking force that is actually applied to the wheel. A similar effect can be exerted when the efficacy factor K is used as the new conversion factor Kb.

In the case where the vehicle 90 is operated by the driver, it can be expected that the driver performs the operation to eliminate the sense of discomfort associated with the deviation even when the deviation occurs between the required braking force BP and the braking force that is actually applied to the wheel. On the other hand, in the case where the autonomous travel is made, intervention by the driver is less likely to be expected. Accordingly, in the case where the autonomous travel is made, it is effective to accurately estimate the efficacy factor K like the control device 10 and use the efficacy factor K for the braking force control.

In the case where a relationship between the pressing force for the front wheel 81 and the braking force significantly differs from a relationship between the pressing force for the rear wheel 82 and the braking force, a ratio of the actual front-wheel braking force that is applied according to the front-rear distribution ratio a possibly deviates from a ratio that is assumed on the basis of the front-rear distribution ratio a. In regard thereto, according to the control device 10, the front-rear distribution ratio a can be adjusted on the basis of the difference between the efficacy factor K for the front wheel 81 and the efficacy factor K for the rear wheel 82. In this way, it is possible to suppress the deviation of each of the ratio of the front-wheel braking force and the ratio of the rear-wheel braking force from the desired ratio.

Modified Examples

This embodiment can be implemented with the following modifications. This embodiment and the following modified examples can be implemented in combination with each other within the scope that is not technically contradictory.

In the above embodiment, the example has been described in which the braking force for the front wheel 81 and the braking force for the rear wheel 82 are alternately applied in the case where the micro-braking control is executed repeatedly. The disclosure is not limited thereto. For example, the micro-braking control for applying the braking force to the front wheel 81 may be executed multiple times.

In the above embodiment, the example has been described in which the braking force is applied to the front wheel 81 or the rear wheel 82 in the period from the start of the micro-braking control to the termination of the micro-braking control. Instead thereof, in the micro-braking control, the braking force can be applied to the front wheel 81 and the rear wheel 82. A description will be made with reference to FIGS. 9A-9C.

Figures 9A, 9B:
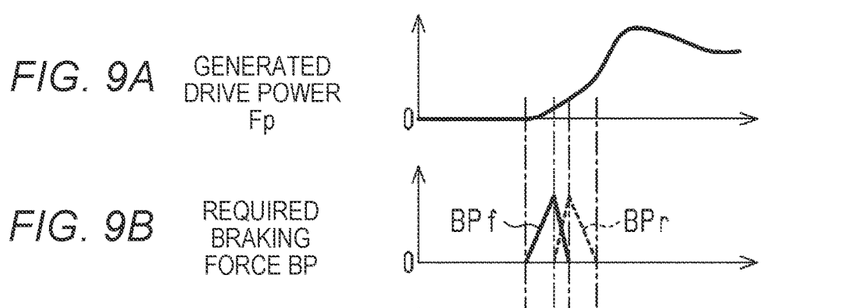
FIGS. 9A, 9B and 9C are timing charts illustrating a transition of a braking force by micro-braking control that is executed by a control device in a modified example.
Figure 9C:
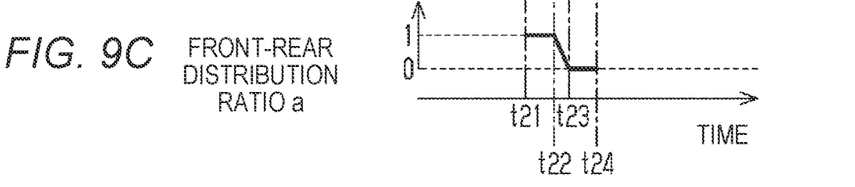

In an example illustrated in FIGS. 9A-9C, at timing t21, it is determined that the start condition is satisfied, and the application processing in the micro-braking control is started (S102). Here, first, the braking force is applied only to the front wheel 81. As indicated by a solid line in FIG. 9B, the required front-wheel braking force BPf starts increased at the timing t21. The front-rear distribution ratio a at this time is "1" as illustrated in FIG. 9C.

As illustrated in FIG. 9C, the front-rear distribution ratio a is gradually reduced from timing t22. As this result, as indicated by the solid line in FIG. 9B, the required front-wheel braking force BPf starts reduced. Furthermore, as indicated by a broken line in FIG. 9B, the required rear-wheel braking force BPr starts increased. At timing t23, the front-rear distribution ratio a is reduced to "0".

At the timing t23, it is determined that the termination condition is satisfied, the application processing is terminated, and the cancellation processing is started (S104). Thus, at the timing t23 onward, the required rear-wheel braking force BPr is reduced. At timing t24, the required rear-wheel braking force BPr is "0".

In the example illustrated in FIGS. 9A-9C, a period up to the timing t23 is a period in which the required braking force BP is increased. During the execution of such micro-braking control, the factor estimation processing may be executed to estimate the efficacy factor K. In this case, the hydraulic pressure fluctuation amount ΔP for the front wheel 81 and the hydraulic pressure fluctuation amount ΔP for the rear wheel 82 may be calculated in consideration of the front-rear distribution ratio a.

In the above embodiment, the example has been described in which the required braking force BP is calculated on the basis of the map illustrated in FIG. 5 in the micro-braking control. Instead thereof, an increase amount of the required braking force BP during the execution of the micro-braking control may be set.

For example, the increase amount of the required braking force BP can be calculated by using the map in FIG. 5 in which the vertical axis represents the increase amount of the required braking force BP. That is, the increase amount of the required braking force BP can be set on the basis of a relationship between the generated drive power Fp and the increase amount of the required braking force BP. In this case, the increase in braking force is more likely to continue while the application processing is executed. That is, while the application processing executed, a period in which the braking force is kept constant and a period in which the braking force is reduced are less likely to occur. For this reason, it is possible to suppress extension of a period until the braking force that is applied by the micro-braking control becomes large. Thus, it is possible to reduce a time required to complete the estimation of the efficacy factor K. As a result, it is possible to reduce duration of the micro-braking control. By executing the micro-braking control in a short period, the acceleration of the vehicle 90 is less likely to be interrupted.

In addition, in the case where the generated drive power Fp is increased at specified increase rate Fps or higher, the required braking force BP may be increased to the maximum braking force bmax at a preset increase rate. Just as described, in the micro-braking control, the increase rate of the required braking force BP can be set to the preset increase rate. For example, in the case where it is set that the increase rate of the required braking force BP fluctuates according to the increase rate of the generated drive power Fp, there is a possible delay in the increase of the required braking force BP or a possible sudden increase in the required braking force BP. In the case where the required braking force BP is increased rapidly, actuation noise may be increased in conjunction with the increase in the required braking force BP. On the contrary, in the case where the increase rate of the required braking force BP is set to the preset increase rate as in the above configuration, it is possible to suppress occurrence of the delay in the increase of the required braking force BP and the increase in the actuation noise.

In the above embodiment, the condition A and the condition B are exemplified as the start conditions of the micro-braking control. However, the start condition is not limited thereto. The start condition may include that the vehicle speed is lower than a specified determination speed. The start condition may include that a change amount of the vehicle speed is smaller than a specified speed change amount. The start condition may include that the temperature of the friction member 75 is lower than a specified determination temperature.

In the above embodiment, in the case where the braking force is increased as the processing in step S202, the processing in step S203 is executed. The processing in step S203 may be executed in the case where the braking force is equal to or larger than a specified determination braking force in addition to the increase in the braking force. In other words, the hydraulic pressure fluctuation amount ΔP and the drive power deviation ΔF in a period in which the braking force is smaller than the determination braking force during the execution of the micro-braking control may not be used to estimate the efficacy factor K.

Even in the case where the braking force is increased during the execution of the micro-braking control, the hydraulic pressure fluctuation amount ΔP and the drive power deviation ΔF during turning may not be used to estimate the efficacy factor K when the vehicle 90 turns. In some cases, when the vehicle 90 turns, the actual drive power Fx is reduced due to a factor other than the braking force. By not using the hydraulic pressure fluctuation amount ΔP and the drive power deviation ΔF at the time when the actual drive power Fx is reduced due to the factor other than the braking force for the estimation, it is possible to eliminate the factor causing an error and to accurately estimate the efficacy factor K.

Whether the vehicle 90 turns can be detected by an operation amount of a steering operation member, for example. In addition, turning of the vehicle 90 can be detected by a steering angle of a steering wheel. Turning of the vehicle 90 can also be detected on the basis of a steering command by the autonomous driving control device 30.

In the above embodiment, the hydraulic pressure fluctuation amount ΔP is calculated by using the braking hydraulic pressure P that is based on the detection value by the hydraulic pressure sensor 61. The hydraulic pressure fluctuation amount ΔP can also be calculated on the basis of the target value of the pressing force, for example.

The termination condition of the micro-braking control is not limited to that exemplified in the above embodiment. For example, even in the case where the specified time has not elapsed since the start of the application processing, it can be determined that the termination condition is satisfied when the vehicle 90 starts turning.

In the above embodiment, the hydraulic braking system is exemplified as the friction braking system 70. The friction braking system 70 is not limited to the hydraulic braking system, and a mechanical friction braking system, in which the friction member is pressed against the rotary body by mechanically transmitting a drive amount of the electric motor, may be adopted. In this case, the magnitude of the pressing force corresponds to the drive amount of the electric motor. In such a configuration, the efficacy factor K can be estimated by using a fluctuation amount of the drive amount of the electric motor instead of the hydraulic pressure fluctuation amount ΔP in the above embodiment.

In the above embodiment, the temperature of the friction member is estimated by the friction member temperature estimation unit 14. The temperature of the friction member 75 may be acquired by a temperature sensor.

The invention claimed is:

1. A control device that is applied to a vehicle having: a power source that generates drive power; and a friction braking system that applies a braking force to a wheel according to a pressing force to press a friction member against a rotary body integrally rotating with the wheel and can adjust the braking forces applied to a front wheel and a rear wheel of the wheels separately, the control device comprising:
a braking control unit that controls the friction braking system; and
an estimation unit that estimates an efficacy factor as a factor indicating a relationship between a magnitude of the pressing force and a magnitude of the braking force, wherein
the braking control unit can start micro-braking control for generating the braking force on at least one wheel of the front wheel and the rear wheel in the case where the drive power is increased, and
during execution of the micro-braking control, the estimation unit estimates the efficacy factor for the wheel, to which the braking force is applied by the micro-braking control, on the basis of a deviation between generated drive power that is based on a required value for the power source and actual drive power that actually acts on the vehicle, and the pressing force that corresponds to the wheel, to which the braking force is applied by the micro-braking control.

2. The control device according to claim 1, wherein in the micro-braking control, the braking control unit generates the braking force on either one wheel of the front wheel and the rear wheel.

3. The control device according to claim 1, wherein in the micro-braking control, the braking control unit generates the braking force on both wheels of the front wheel and the rear wheel on the basis of a front-rear distribution ratio indicating a ratio of the braking force applied to the front wheel to a total braking force that is a sum of the braking force applied to the front wheel and the braking force applied to the rear wheel.

4. The control device according to claim 3, wherein
the braking control unit executes application processing to apply the braking force when the micro-braking control is started, executes cancellation processing to reduce the braking force to "0" after termination of the application processing, and terminates the micro-braking control, and
when calculating the efficacy factor, the estimation unit uses the deviation between the generated drive power and the actual drive power in a period in which the braking force is increased.

5. The control device according to claim 4, wherein in the application processing, the braking control unit calculates, as the required braking force used for control of the friction braking system, a smaller value than the braking force that matches the generated drive power.

6. The control device according to claim 5, wherein in the application processing, the braking control unit calculates the required braking force according to the generated drive power, and calculates the larger required braking force as the generated drive power is increased within a range where the generated drive power is equal to or lower than a specified threshold value.

7. The control device according to claim 6, wherein in the micro-braking control, the braking control unit terminates the application processing and starts the cancellation processing in the case where a specified time has elapsed since the start of the application processing.

8. The control device according to claim 7, wherein in the case where the drive power starts reduced during the micro-braking control, the braking control unit terminates the application processing and starts the cancellation processing even when the specified time has not elapsed since the start of the application processing.

9. The control device according to claim 8, wherein in the case where the vehicle starts turning during the execution of the micro-braking control, the estimation unit does not use the pressing force and the deviation between the generated drive power and the actual drive power in a period in which the vehicle turns for calculation of the efficacy factor.

10. The control device according to claim 5, wherein in the micro-braking control, the braking control unit terminates the application processing and starts the cancellation processing in the case where a specified time has elapsed since the start of the application processing.

11. The control device according to claim 4, wherein
in the micro-braking control, the braking control unit terminates the application processing and starts the cancellation processing in the case where a specified time has elapsed since the start of the application processing.

12. The control device according to claim 3, wherein in the case where the vehicle starts turning during the execution of the micro-braking control, the estimation unit does not use the pressing force and the deviation between the generated drive power and the actual drive power in a period in which the vehicle turns for calculation of the efficacy factor.

13. The control device according to claim 2, wherein
the braking control unit executes application processing to apply the braking force when the micro-braking control is started, executes cancellation processing to reduce the braking force to "0" after termination of the application processing, and terminates the micro-braking control, and
when calculating the efficacy factor, the estimation unit uses the deviation between the generated drive power and the actual drive power in a period in which the braking force is increased.

14. The control device according to claim 13, wherein
in the micro-braking control, the braking control unit terminates the application processing and starts the cancellation processing in the case where a specified time has elapsed since the start of the application processing.

15. The control device according to claim 2, wherein in the case where the vehicle starts turning during the execution of the micro-braking control, the estimation unit does not use the pressing force and the deviation between the generated drive power and the actual drive power in a period in which the vehicle turns for calculation of the efficacy factor.

16. The control device according to claim 1, wherein
the braking control unit executes application processing to apply the braking force when the micro-braking control is started, executes cancellation processing to reduce the braking force to "0" after termination of the application processing, and terminates the micro-braking control, and when calculating the efficacy factor, the estimation unit uses the deviation between the generated drive power and the actual drive power in a period in which the braking force is increased.

17. The control device according to claim 16, wherein in the micro-braking control, the braking control unit terminates the application processing and starts the cancellation processing in the case where a specified time has elapsed since the start of the application processing.

18. The control device according to claim 1, wherein in the case where the vehicle starts turning during the execution of the micro-braking control, the estimation unit does not use the pressing force and the deviation between the generated drive power and the actual drive power in a period in which the vehicle turns for calculation of the efficacy factor.

* * * * *